March 25, 1969 R. AMBROS 3,434,641
PULLEY TRANSMISSIONS AND INSTALLATIONS WHICH
INCLUDE PULLEY TRANSMISSIONS
Filed Aug. 5, 1966 Sheet 2 of 3
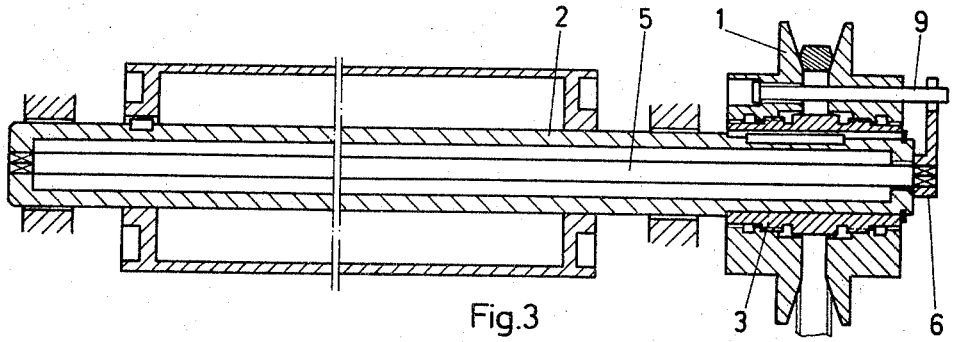
Fig.3
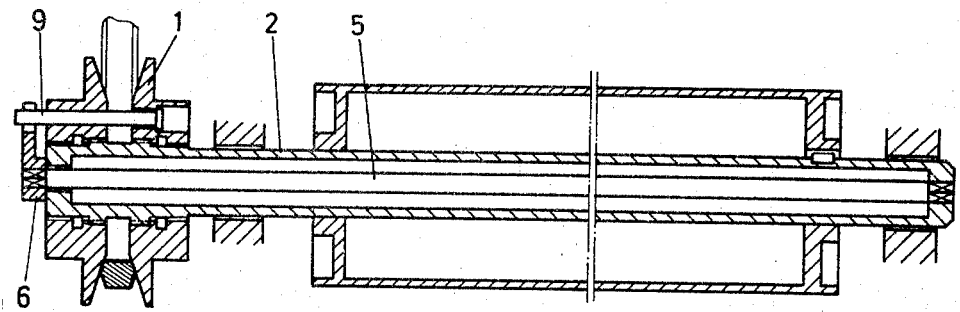
Fig.4
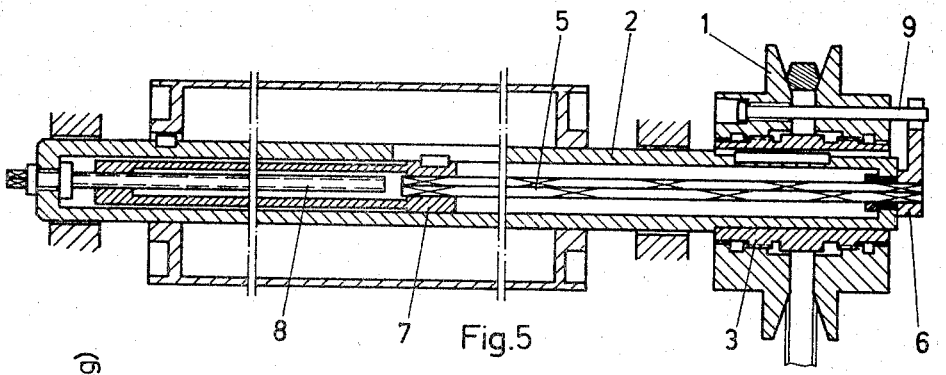
Fig.5
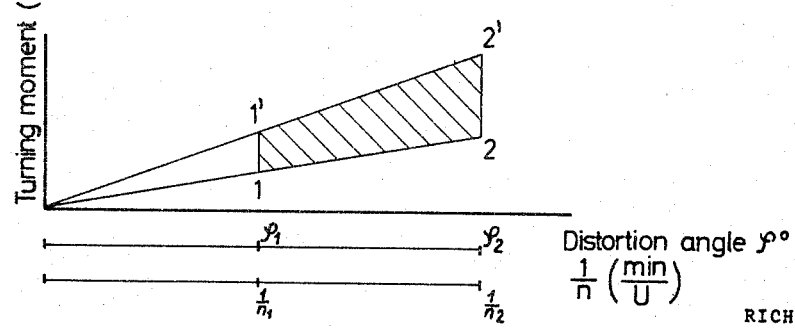
INVENTOR
RICHARD AMBROS

United States Patent Office 3,434,641
Patented Mar. 25, 1969

3,434,641
PULLEY TRANSMISSIONS AND INSTALLATIONS
WHICH INCLUDE PULLEY TRANSMISSIONS
Richard Ambros, 46 Grunbergerstr.,
85 Nuremberg, Germany
Filed Aug. 5, 1966, Ser. No. 570,449
Claims priority, application Germany, Aug. 10, 1965,
A 49,958
Int. Cl. B65h 17/20, 77/00; F16h 55/52
U.S. Cl. 226—188                                    19 Claims

ABSTRACT OF THE DISCLOSURE

A pulley transmission capable of automatically regulating the turning moment provided by the transmission. A pair of pulley flanges surround a shaft of the transmission with respect to which they are freely turnable. These flanges have inner belt-engaging faces which define a circumferential tapered gap between themselves. A connecting means connects one of the flanges to the other for rotation therewith but for axial movement with respect thereto for changing the width of the gap, and a yieldable means is connected between at least one of the flanges and the shaft for yieldably resisting a change in the angular position of the shaft and flanges with respect to each other. An adjusting means is connected to that flange which is axially movable to adjust it with respect to the other flange, and this adjusting means takes the form of a threaded connection between this latter flange and the shaft. Thus, in response to a change in a force acting on the yieldable means, the axially moveable flange will be displaced at its threaded connection with the shaft axially with respect to the other flange in response to relative turning of the flanges and shaft.

---

The present invention relates to pulley transmissions and to installations which require the use of pulley transmissions.

In particular, the present invention relates to pulley transmissions which are self-regulating in the sense that they are capable of automatically regulating the turning moment provided by the transmission. Such self-regulating transmissions are used particularly in connection with the handling of sheet material.

During the handling of sheet material it sometimes happens that the material will, for various reasons, become elongated so as to increase in length or instead will shrink, or in the case where such sheet material is in the form of a web transported over rollers, the elongating or shrinking of the sheet material can result in undesirable slack or undesirable tension, respectively, in the sheet material.

It is accordingly a primary object of the present invention to provide in connection with installations which handle sheet material in this general way, or in connection with installations which are handle sheet material in this general way, or in connection with installations which are used for winding or unwinding sheet material, pulley transmission which will automatically respond to changes of the above type of automatically maintaining in the sheet material a substantially constant condition where the tension in the sheet material is not too great and where, on the other hand, there is no undesirable slack in the sheet material.

It is furthermore an object of the present invention to provide pulley transmissions which are capable of being used in installations where sheet materials are withdrawn from a given machine or delivered to a given machine, with these transmissions of the invention responding automatically to changes in condition of the sheet material to maintain the latter under a constant tension.

Yet another object of the present invention is to provide a pulley transmission capable of producing a constant, adjustable tension in a sheet material which is wound or unwound, irrespective of whether the winding or unwinding takes place with respect to a shaft or core around which the sheet material is wound or with respect to an arrangement where the wound sheet material rests at its periphery on rollers which are driven to rotate the wound roll of sheet material so as to wind or unwind the latter.

It is further an object of the present invention to provided a pulley transmission which will produce for installations of the above general type a predetermined relationship between the turning moment and speed of revolution derived from the pulley transmission.

Yet another object of the present invention is to provide a pulley transmission which is capable of producing a smooth start in the rotating of the pulley transmission and structure driven thereby.

Also, it is an object of the present invention to provide an installation where a plurality of the pulley transmissions of the invention are combined together in a special way which will give a very precise control for the winding or unwinding or sheet material.

Also, the objects of the present invention include the provision of an installation where a plurality of the pulley transmissions of the invention are combined in such a way that a web of sheet material can be transported with precise control of the condition of the sheet material during its transportation.

Thus, the present invention can be utilized either by itself or with other structures wherever it is required to provide a drive at a speed of rotation which will correspond to a sheet material tension which is to be maintained constant at a selected value. Thus, the invention is particularly applicable where the turning moment required for the drive is determined in accordance with the desired tension of the sheet material. The speed of movement of the sheet material will be determined by nip rollers, for example, which engage and transport the sheet material at a given speed or by any other sheet-advancing structure driven from a suitable machine.

The structure of the invention can be used, for example, in connection with the relatively low tension transportation or adjustable tension transportation of sheet material. Such transportation can be used in the drive of a cylindrical drying machine, a hot air drying machine, washing and impregnating machines where the sheet material is maintained at a relatively low tension, machines where the sheet material is subjected to the influence of steam, condensing machines, sheet material distributing machines, rolls for withdrawing sheet material from a given location, etc.

Also, the structure of the invention can be used in connection with the tension-regulated winding or unwinding of a sheet material, as in the case of driving a roll of sheet material either at the center or periphery thereof with machines and installation dealing primarily with textile, paper, or plastic sheet materials.

With the pulley transmission of the present invention there is a shaft means and a pair of pulley flanges which surround the shaft means and are freely turnable with respect thereto. These flanges respectively have inner belt-engaging faces which are directed toward each other and which define between themselves a circumferential tapered gap which in the region of the outer periphery of the flanges is wider than in the region of the inner periphery thereof. A connecting means connects at least one of these pulley flanges to the other of the flanges for rotation therewith but for axial movement toward and away from this other flange, so as to change the width of the gap between the flanges. A yieldable means is connected between at least one of the flanges and the shaft means for yieldably resisting a change in the angular position of the shaft means and flanges one relative to the other, and an adjusting means operatively connected at least to that one of the flanges which is movable toward and away from the other of the flanges for axially adjusting the movable flange relative to the other flange in response to a change in a force acting on the yieldable means, so that the width of the gap between the flanges will be automatically adjusted in accordance with the force transmitted between the flanges and the shaft means. A pulley belt is situated in the gap between the flanges, engaging the latter, so that during movement of the movable flange away from the other flange, the pulley belt will be displaced toward the shaft means to be situated at a smaller radial distance therefrom, while during movement of the movable flange toward the other flange the pulley belt will be displaced away from the shaft means to be situated at a larger radial distance therefrom. The yieldable means preferably includes a spring structure, while the adjusting means for adjusting that flange which is movable toward and away from the other flange with respect to the shaft means preferably includes a threaded connection between the movable flange and the shaft means.

The structure of the invention is considerably superior to known constructions inasmuch as the automatic regulation achieved with the structure of the invention is carried out with practically no friction and the reaction of the structure of the invention is extremely sensitive to any change in turning moment. Furthermore, the structure of the invention is exceedingly compact inasmuch as it can be included in a single pulley transmission where only one pair of flanges surround one shaft with the yieldable means of the invention connected only to parts which transmit turning movements or turning moments.

The invention is illustrated by way of example in the accompanying drawings which form part of this application and in which:

FIG. 3 is a longitudinal sectional elevation of another embodiment of a pulley transmission according to the invention, shown in FIG. 3 connected with additional structure;

FIG. 4 is a longitudinal sectional elevation of another arrangement of a pulley transmission of the invention shown in connection with additional components;

FIG. 5 is a longitudinal sectional elevation of a further embodiment of a pulley transmission according to the invention shown in connection with an adjusting structure for adjusting the spring force, FIG. 5 including at its lower portion a graph which demonstrates the operation of the structure shown in FIG. 5;

Figure 7:
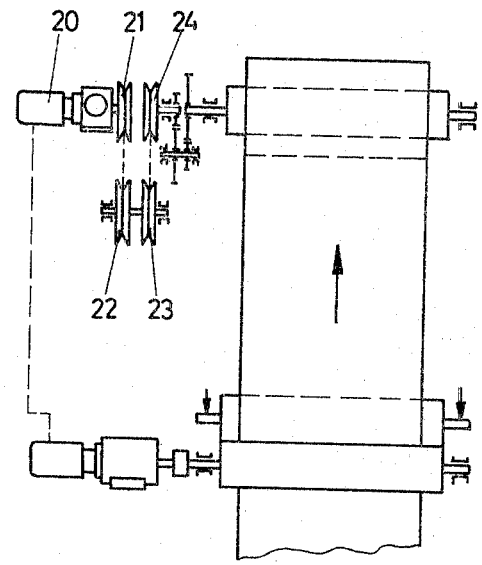
Figure 8:
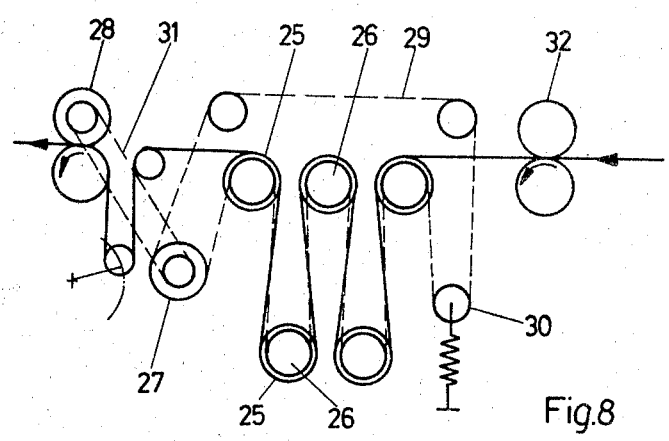

FIG. 7 is a schematic representation of an installation of the present invention utilizing pulley transmissions of the invention in connection with the winding of a web of sheet material; and FIG. 8 is a schematic side elevation of an installation of the invention used in connection with the transportation of a web of sheet material, the installation of FIG. 8 also utilizing pulley transmissions of the invention.

Figure 1:
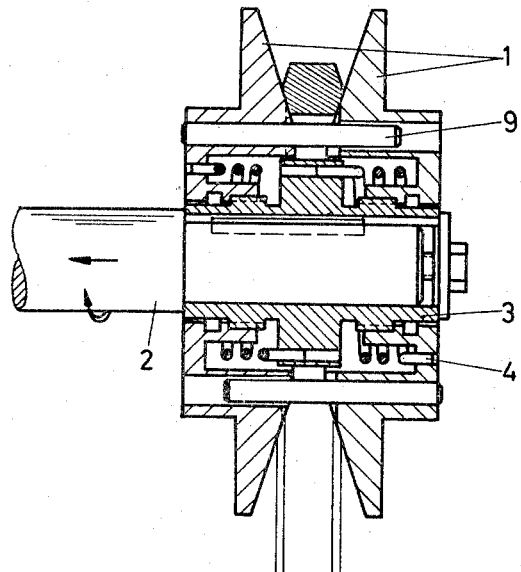
FIG. 1 is a longitudinal sectional elevation of one possible embodiment of a driven pulley transmission according to the invention.

Referring to FIG. 1, the pulley transmission shown therein is a driven pulley transmission in the sense that the drive is transmitted from the fragmentarily illustrated pulley belt through the transmission to the shaft means 2, 3 of the transmissions. This shaft means includes a shaft 2 which is driven by the transmission and which may be used for driving rolls for transporting sheet material or for driving a structure which winds up a sheet material, for example.

The turning moment is delivered by the transmission from the pulley belt to a pair of pulley flanges 1 which respectively have inner belt-engaging faces which define between themselves a tapered circumferential gap surrounding the shaft means 2, 3, this gap being wider in the region of the outer periphery of the flanges 1 than in the region of the inner periphery thereof, as illustrated in FIG. 1. The part 3 of the shaft means is in the form of a hub which is keyed to the shaft 2 so as to be turnable as a unit therewith. The pair of pulley flanges 1 are freely turnable with respect to the shaft means 2, 3 and a yieldable means is situated between the pulley flanges 1, on the one hand, and the shaft means 2, 3, on the other hand, for transmitting rotary movement therebetween. This yieldable means will normally urge the flanges and shaft means to turn one relative to the other in a given direction, and will yieldably resist angular movement of these components one relative to the other in an opposite direction, so that the power is transmitted between the flange structure of the pulley transmission and the shaft means thereof by way of the yieldable means 4. The yieldable means stores a force which is delivered upon yielding of the yieldable means. In the illustrated example the yieldable means takes the form of a pair of coil springs 4 which are situated in suitable recesses of the pulley flanges, as illustrated in FIG. 1, surrounding the hub 3. The springs 4 respectively have outer ends connected with the pulley flanges and inner ends connected with the hub 3 of the shaft means in the manner illustrated in FIG. 1, so that in this way the drive is transmitted between the flanges, on the one hand, and the shaft means, on the other hand.

A connecting means interconnects the pair of flanges 1 so that they are constrained to turn together while at the same time at least one of the flanges is movable toward and away from the other of the flanges. This connecting means in the illustrated example takes the form of a plurality of pins 9 respectively fixed to the pulley flanges and each extending from one pulley flange into an aligned bore of the other pulley flange, so that in this way the pins 9 compel the pulley flanges to turn together, preventing any relative rotation therebetween, while at the same time each pulley flange is movable toward and away from the other pulley flange along the axis of the shaft means.

An adjusting means is provided for adjusting the distance between the pulley flanges, and in the illustrated example this adjusting means takes the form of a pair of threaded connections provided between the pair of flanges and the hub 3. Thus, the inner periphery of the right flange 1 of FIG. 1 is threaded onto the hub 3, and the inner periphery of the left flange 1 of FIG. 1 is threaded onto the hub 3. While these threads are identical with respect to their pitch, they are of opposite hand in that one of the threaded connections is formed by a left hand thread and the other threaded connection is formed by a right hand thread. Moreover, the pitch of the threads is small enough so that they are self-locking in the sense that the flanges 1 will remain on the shaft means 2, 3 in whatever angular positions they are turned to with respect to the shaft means 2, 3 by the action of the yieldable means 4. In other words, it is not possible to provide relative turning movement between the shaft means and the pulley flanges in response to axial forces acting on the pulley flanges of FIG. 1.

Under certain conditions it may happen that there is a force tending to reduce the speed of rotation of the shaft 2. For example, during the driving of supply rolls for sheet material, there may be a reduction in the speed of movement of the sheet material derived from nip rollers which engage the sheet material, as a result of shrinking or shortening of the sheet material, for example, so that under these conditions the shaft means seeks to turn faster than permitted by the speed of movement of the sheet material. Also, it may happen that during the winding of the sheet material into a roll, the continuous increase in the diameter of the wound roll of sheet material provides also a situation where the shaft means seeks to turn faster than permitted by the linear speed of movement of the sheet material and the speed of rotation of the winding shaft determined by the roll diameter. Under these conditions the yieldable means 4 will become tensioned further so that the pair of pulley flanges 1 will simultaneously turn relative to the hub 3 at the threaded connections of the adjusting means, with the result that the pair of flanges 1 will axially move toward each other, thus displacing the belt outwardly away from the shaft means to increase its radial distance therefrom and thus to increase the nominal diameter of the pulley transmission, and therefore the speed of rotation of the transmission will automatically diminish.

On the other hand, if the tension in the sheet material drops as a result, for example, of an increase in the predetermined speed of movement of the sheet material resulting from lengthening thereof, the tension of the springs 4 will diminish, the flanges 1 will move apart from each other, causing the belt to move toward the shaft means and reducing the nominal diameter of the transmission, so as to increase the speed of rotation thereof automatically. Thus, the structure of the invention operates automatically to adapt itself to the drive either of a continuously advancing web of sheet material or to sheet material which is being wound up, and the automatic regulation will maintain a constant tension in the sheet material.

In the case where the drive is transmitted directly to a shaft around which the sheet material is wound, the pretensioning of the springs 4 is selected in such a way that the turning moment will increase in proportion to the nominal diameter of the transmission so that for a transmission as shown in FIG. 1:

$$Md_1:Md_2=D_1:D_2$$

where $Md_1$ and $Md_2$ are respectively the turning moments while $D_1$ and $D_2$ are the nominal diameters.

During the unwinding of a web of sheet material from a supply roll, it is necessary to provide a control from the sheet material itself. Thus, in this case a driving transmission such as that shown in FIG. 2 will be used where the drive is transmitted from the shaft means through the transmission to the belt.

Figure 2:
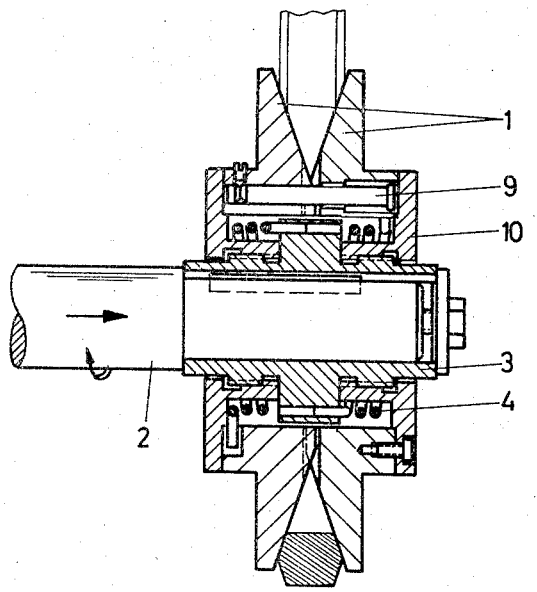
FIG. 2 is a longitudinal sectional elevation of one possible embodiment of a driving pulley transmission according to the present invention.

Thus, in the driving transmission of FIG. 2, the shaft means 2, 3 is the source of the drive for the transmission and it is from this shaft means that the remaining parts of the transmission are driven. The turning moment is transmitted from the shaft means 2, 3 to the yieldable means formed by the coil springs 4 and from the latter to the pulley flanges 1 which in turn transmit the rotary movement to the belt. In the case where the movement of the belt is retarded, the belt will act through the pulley flanges 1 on the springs so as to change the force acting on the yieldable means formed thereby, thus bringing about axial displacement of the pulley flanges at their threaded connection with the hub 3, the flanges moving away from each other under these conditions so that the nominal diameter of the transmission will become smaller and the speed of movement of the belt will diminish.

In the case where the drive is taken directly from the shaft around which the sheet material is wound, the pretensioning of the spring is chosen in such a way that the turning moment will vary inversely with respect to the nominal diameter of the transmission, so that:

$$Md_1:Md_2=D_2:D_1$$

While the construction of FIG. 2 is substantially identical with that of FIG. 1, FIG. 2 shows further constructive details producing certain advantages for the structure of the invention, and these further details can be used not only in a driving transmission as shown in FIG. 2 but also in a driven transmission as shown in FIG. 1.

With the embodiment of FIG. 2, the flanges of the transmission are made of two parts so as to be able to achieve the required pretension of the yieldable means. Thus, in FIG. 2 each flange includes a frusto-conical ring 1 which is turnable with respect to a flange hub 10 which is in turn threaded to the hub 3. In order to fix the ring 1 and flange hub 10 to each other at a selected angular position relative to each other, each hub 10 is provided with an arcuate slot extending along a circle whose center is in the axis of the shaft means, and a bolt passes through this slot as shown at the lower right of FIG. 2, the slot having such a construction that it is of a stepped cross section to engage the head of the bolt in the manner shown in FIG. 2, while the shank of the bolt can extend through the slot into a threaded bore of the ring 1. When the bolt is loosened it is possible to turn the hub 10 and the ring 1, one relative to the other, so as to provide a given pretension in the spring 4, and when this pretension is provided, the bolt is tightened so that in this way each spring 4 can be initially set with a given tension therein. Of course, any suitable mechanism may be provided for producing the relative turning between the ring 1 and the hub 10 in order to adjust the initial tension of the spring 4.

In addition, FIG. 2 shows a construction which limits the extent to which the pulley flanges can be displaced apart from each other. For this purpose the pin 9 which is shown in FIG. 2 has at its left end a V-groove in which a set screw is received and at its right end a collar which is capable of being engaged by a stop surface of the right ring 1 of FIG. 2, this stop surface being in the form of a shoulder in a bore in which the right end of the pin 9 of FIG. 2 is situated. In this way the extent to which the flanges can move apart from each other is limited. It is also possible to limit the extent of movement of the flanges of the pulley apart from each other by suitable stop surfaces on the hub 3 which engage with coacting surfaces of the flanges.

FIG. 3 shows another embodiment of the invention where the illustrated pulley transmission is a driven transmission mounted directly on the driven shaft which turns a roll on which sheet material is would or from which a roll on which sheet material is wound or from which sheet material is unwound.

In contrast with the embodiments of FIGS. 1 and 2, the yieldable means of FIG. 3 does not take the form of a coil spring and instead takes the form of a torsion bar 5. In this embodiment the shaft means 2, 3 includes an elongated hollow shaft 2 in which the torsion bar 5 is situated coaxially with respect to the shaft 2.

The turning moment is transmitted in this case from the belt through the pair of pulley flanges 1 and the pin 9 to a lever 6 which is formed with a suitable notch, for example, into which the pin 9 extends, and this lever 6 is fixed to a non-circular end of the torsion bar 5 which at its opposite non-circular end is fixed with the shaft 2 in the manner illustrated at the left end of FIG. 3, so that in this way the force of the yieldable means 5 is transmitted between the flanges, on the one hand, and the shaft means, on the other hand. This structure will in principle operate in the same way as that of FIG. 1.

FIG. 4 shows an embodiment of the invention which is substantially identical with that of FIG. 3. However, in this embodiment the shaft means does not include a separate hub 3 which is keyed onto the shaft 2. Instead, the shaft 2 is itself formed with the threads by which it is connected to the flanges 1, so that the shaft 2 of FIG. 4 itself takes over the function of the hub 3. Except for this feature, the embodiment of FIG. 4 is the same as that of FIG. 3, the parts being illustrated in FIG. 4 in an arrangement which is the reverse of that of FIG. 3.

FIG. 5 shows a special construction of the invention particularly suitable for winding a web of sheet material onto a roll in the case where the transmission is delivered to the axis of the roll.

In contrast with the embodiment of FIGS. 3 and 4, the drive from the belt to the pulley flanges is transmitted from the torsion bar 5 not to the shaft 2 but instead to a force-transmitting element 7. This force-transmitting element 7 and the torsion bar 5 are capable of being axially adjusted one relative to the other, so as to adjust in this way the effective length of the torsion bar 5. For this purpose the torsion bar 5 is of a noncircular cross section along its entire length, such as a square cross section, and the right end of the element 7 is of a mating cross section so that the torsion bar 5 is slidably received in the opening at the right end of element 7 which mates with the cross section configuration of the torsion bar 5. Thus, the elements 5 and 7 will turn together but are axially movable one relative to the other. In addition, the element 7 fixedly carries a key which slides in a suitable keyway or slot formed in the hollow shaft 2, so that the element 7 cannot turn relative to the shaft 2 but can only move axially with respect thereto. Axial movement of the element 7 is brought about by way of a threaded spindle turnably carried by the left end of the shaft 2, as viewed in FIG. 5, and extending into a threaded bore formed in the left end of the hollow element 7, so that by turning the spindle 8 it is possible to adjust the axial position of the element 7 with respect to the torsion bar 5.

Referring to the graph shown at the lower part of FIG. 5, the illustrated square torsion bar, which is to say square in cross section, in its unstressed condition will provide a turning moment $Md=0$, and this turning moment is indicated along the ordinate of the graph. In the event that the force-transmitting element 7 is shifted so far to the left, as viewed in FIG. 5, that the torsion bar 5 has its maximum effective length, as indicated in FIG. 5, then it is necessary to provide in the torsion bar a given prestress $Md_1$, which can be brought about by providing at the periphery of the lever 6 a suitable ratchet piece which will cooperate with a spring-pressed pawl carried by the outer right end of the pin 9, as viewed in FIG. 5, or the lever 6 can take the form of a suitable disc which can be adjustably connected at a selected angular position with respect to the pin 9 in any suitable way. In this case the driven pulley transmission of FIG. 5 will operate according to the relationship:

$$Md_1:Md_2=D_1:D_2=n_2:n_1$$

where $n$ is the speed of rotation.

The torsion bar is at its effective length turned through an angle $\varphi_1$ to provide the pretension, and this angle is indicated along the abscissa of the graph. When the force-transmitting element 7 is shifted to the right by turning of the spindle 8, as viewed in FIG. 5, then the effective length of the torsion bar is reduced, and with no change in the position of the pulley flanges the angle $\varphi$ between the ends of the spring at its effective length remains constant. The turning moment, however, for the same nominal diameter of the pulley transmission, is increased to $Md_1'$, and the turning moment curve will now be raised as shown in the graph as a result of the harder characteristics of the spring, so as to be in the rotary speed range from $Md_1'$ to $Md_2'$, the inverse of the speed of rotation being indicated also along the abscissa of FIG. 5.

Thus, by axial movement the force-transmitting element 7 there is with a simultaneous increase of the pretension a change in the characteristics of the spring required to maintain, for holding the tension in the sheet material constant, the following conditions:

$$Md_1:Md_2=Md_1':Md_2''=D_1:D_2=n_2:n_1$$

Thus, the tension of the sheet material can be varied in proportion with the adjustable pretension.

The spindle 8 can also be maintained stationary so that during operation a shifting of the force-transmitting element 7 can be brought about by the pressure of an axially acting bearing, and in this way it is possible to provide a change in the tension of the sheet material.

Figure 6:
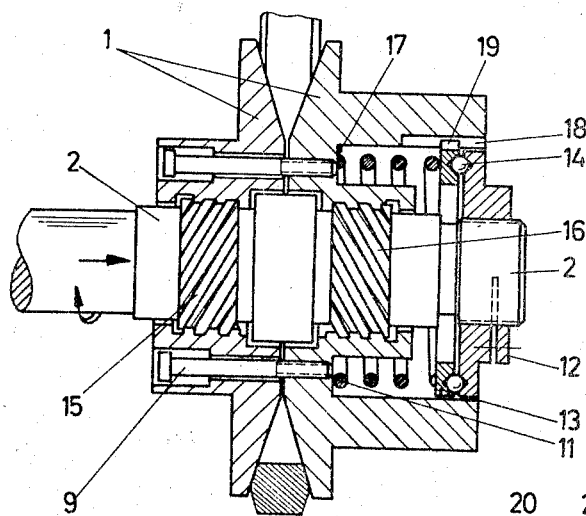
FIG. 6 is a longitudinal sectional elevation of a further embodiment of a pulley transmission of the invention, FIG. 6 showing a driving pulley transmission.

FIG. 6 shows another embodiment of the invention where instead of providing an adjustable means which includes self-locking threads, the threaded connections 15 and 16 of the illustrated adjustable means have a pitch large enough to provide turning of the flanges in response to axial forces acting thereon, so that these threads are not self-locking.

Thus, it will be seen that in FIG. 6 the pair of flanges 1 are respectively connected with the shaft means 2 by way of the threads 15 and 16 which are identical except that they are oppositely directed, and of course these threads have a relatively large pitch so that they are not self-locking. In this embodiment the yieldable means takes the form of a coil spring 11 which is not fixed to any element of the transmission but instead operates solely as a compression spring. This spring produces the adjusting force which corresponds to the desired turning moment. The spring 11 presses at one end against a surface 17 of the right flange 1 of FIG. 6, while the other end of the spring presses against a pressure ring 13 which by way of a ball bearing 14 is turnable with respect to the shaft 2. The pressure ring 13 is constrained to rotate with the right flange 1, and for this purpose the flange 1 is formed with a groove 18 extending axially along the inner hub of the flange 1 and receiving a projection 19 at the outer periphery of the ring 13, this projection 19 being slidable along the axial groove 18.

In the example of FIG. 6, the transmission is a driving pulley transmission so that the spring 11 is arranged in such a way that it tends to displace one of the flanges 1 toward the other. In contrast, if the structure of FIG. 6 is used in a driven pulley transmission, such as of the type shown in FIG. 1, then the spring must be arranged in such a way that it tends to displace one of the flanges away from the other.

FIG. 7 shows an installation for winding a web of sheet material on to a roll, and this particular installation of the invention provides the advantage of considerably increasing the range of possible controls by utilizing a plurality of driving and driven pulley transmissions of the invention in the installation.

Thus, the installation of FIG. 7 includes the drive source 20 from which the power is initially derived through a suitable gear transmission, for example, and the rotary movement derived from the source 20 is delivered to the shaft means of a driving transmission 21 which has the structure of the invention such as that described above. The belt of the driving transmission 21 passes around a driven transmission 22 of the invention, and this driven transmission 22 is in turn coaxially connected through its shaft means with a second driving transmission 23, the shaft means of the driven transmission 22 and the driving transmission 23 being a single unit, for example. The driving pulley transmission 23, which corresponds to any of the driving pulley transmissions of the invention, is in turn connected by way of its belt to a second driven pulley transmission 24 of the present invention, such as any of the driven pulley transmissions described above, and this driven pulley transmission 24 is mounted directly on the winding shaft of the winding roll for the sheet material or, as indicated in FIG. 7, the driven pulley transmission 24 is operatively connected with the winding roll through a stepdown transmission.

If this arrangement of FIG. 7 which includes four pulley transmissions according to the present invention is compared with an installation which has only a single adjustable pulley transmission between the motor and the windup roll, then for a given roll ratio, which is to say for a given ratio between the smallest and largest diameter of the woundup roll of sheet material, there will be for the installation of the invention shown in FIG. 7 a far greater range of adjustment of the tension during winding than in the case of a single adjustable transmission between the motor and the roll. Considering the reverse situation where with an installation as shown in FIG. 7 and an installation including only a single adjustable pulley transmission there is the same tension in the roll, then there will be with the installation including the four pulley transmissions of the invention a far greater roll ratio, which is to say a far greater difference between the smallest and largest diameter of the roll which can be properly wound.

With both types of installations, which is to say with an installation having one adjustable transmission or four adjustable transmissions, it is necessary to provide a drive whose speed of rotation is adjustable, which can be achieved by using an adjustable gear transmission in the drive. Such an adjustable drive is required only for the case where the winding tension is to be changed.

FIG. 8 shows an installation of the invention capable of being used in connection with transportation of a web of sheet material, and in this installation the various individual sheet-transporting rolls are respectively provided with the pulley transmissions of the invention.

The illustrated installation primarily includes a series of sheet-material-transporting rolls 25 arranged one after the other in the direction of movement of the sheet material, and each of these rolls 25 is operatively connected with a driven pulley transmission 26 which may have the construction of any of the above-described driven pulley transmissions of the invention. Moreover, the installation includes a driving pulley transmission 27 which also may have any of the driving pulley transmission constructions of the present invention as described above. A pair nip rolls 28 engage the sheet material to transport the latter to the left, as viewed in FIG. 8, and the driving pulley transmission 27 is driven in synchronism with the nip rolls 28. A belt 29 is common to and extends around the driving pulley transmission 27 and all of the driven pulley transmissions 26 which are respectively connected coaxially with the several transporting rolls 25, and this common endless belt 29 is shown in dotted lines in FIG. 8. As is conventional, a belt-tensioning roll assembly 30 can act on the belt 29 to maintain the latter at a suitable tension.

The synchronous operation of the nip rolls 28 with respect to be driving pulley transmission 27 can, for example, be brought about by way of the pulley belt 31 or the like.

In a known way the speed with which the sheet material is transported is determined by a further pair of supply nip rolls 32 which nip between themselves the sheet material so as to advance the latter at a given speed.

The pair of nip rolls 28 and the pair of nip rolls 32 are controlled so as to be maintained in synchronism by a suitable dancing-roll arrangement which is well known.

With a winding installation as shown in FIG. 7 it is of advantage to have the drive means for the windup roll operating synchronously with the main drive 20 of the installation. For this purpose the main drive 20 can in a manner similar to the web-transporting installation of FIG. 8, include a pair of nip rolls.

Thus, as may be seen from the lower part of FIG. 7 a pair of nip rolls engage the sheet material as it is advanced to the windup or takeup roll, and the pair of nip rolls shown at the lower right of FIG. 7 are directly driven by the main drive which in turn is connected through a suitable transmission, indicated by the dotted line at the left of FIG. 7, to the drive means 20 which is connected to the first driving pulley transmission 21 of the present invention.

One of the primary advantages achieved with the structure of the invention is the fact that it is uncomplicated and that it is capable of operating practically without friction while being quite sensitive so that it is capable of fulfilling all of the required functions while at the same time combining only turning moment transmitting elements into a single pulley transmission or onto a single shaft.

With an arrangement as shown in FIG. 8 where the web of sheet material is continuously transported along a plurality of transporting rolls, a plurality of driven transmissions of the invention can be directly connected with the latter rolls as shown at the connections between the driven pulley transmission 26 and the rolls 25 of FIG. 8. The belt can take the form of a wedge-shaped V-belt or a suitable chain can also be used, in accordance with the movement of the material.

With conventional installations used for the same purposes as that shown in FIG. 8, the drive is carried out by way of separate, intermediate pulley installations required by the functions which are to be performed to drive the several rolls through a plurality of endless tension springs similar to a V-belt pulley drive, so as to control the rotation of the web-advancing rolls.

In the case of the takeup of a web into a roll on which it is wound, as shown in FIG. 7, the compact transmission of the invention which is closed in itself and automatically regulates itself can be mounted directly on the motor or drive shaft or directly on the shaft of the takeup roll, since all of the parts required to perform the necessary functions rotate together, in contrast with known constructions where these advantages are not provided.

In order to achieve an increase in the range of control of the speed of rotation, a plurality of the driving and driven pulley transmissions of the invention are situated in the direction in which the power is transmitted, with the driving and driven transmissions alternating one with respect to the other, as shown in FIG. 7. The spring characteristics of the individual pulley transmissions must be arranged in such a way that their turning moments have an inverse proportion to the speed of rotation of the entire installation, so that the turning moments change inversely with changes in this speed of rotation. In other words, the springs must be made harder than in an installation where only one adjustable pulley transmission is provided in the drive.

In correspondence with the increased range of controls with an installation such as that shown in FIG. 7, it is possible to increase not only the tension of the sheet material, by increasing the driving speed of the entire installation, but also to increase the ratio between the largest and smallest diameters of the roll of sheet material which is wound or unwound.

What is claimed is:
1. A pulley transmission comprising shaft means, a pair of pulley flanges surrounding said shaft means and being freely turnable with respect thereto, said flanges respectively having inner belt-engaging faces directed toward each other and defining between themselves a circumferential tapered gap which in the region of the outer periphery of said flanges is wider than in the region of the inner periphery thereof, connecting means connecting at least one of said flanges to the other of said flanges for rotation therewith but for axial movement toward and away from said other flange so as to change the width of said gap between said flanges, yieldable means connected between at least one of said flanges and said shaft means for yieldably resisting a change in the angular position of said shaft means and flanges one relative to the other, and adjusting means operatively connected at least to that one of said flanges which is movable toward and away from the other of said flanges for axially adjusting said one flange relative to said other flange in response to a change in a force acting on said yieldable means, so that the width of the gap between said flanges will be automatically adjusted in accordance with the force transmitted between said flanges and shaft means, and a pulley belt situated in said gap and engaging said flanges, so that during movement of said one flange away from said other flange said pulley belt will be displaced toward said shaft means to be situated at a smaller radial distance therefrom while during move- ment of said one flange toward said other flange said pulley belt will be displaced away from said shaft means to be situated at a larger radial distance therefrom, said adjusting means being in the form of a threaded connection between said one flange and said shaft means, said threaded connection providing axial displacement of said one flange with respect to said shaft means and with respect to the other of said flanges in response to relative turning of said flanges and shaft means one relative to the other.

2. The combination of claim 1 and wherein a threaded connection interconnects the other of said flanges with said shaft means, so that said flanges are respectively connected with said shaft means by a pair of threaded connections and said pair of threaded connections respectively being a left hand threaded connection and a right hand threaded connection.

3. The combination of claim 1 and wherein said yieldable means includes at least one spring.

4. The combination of claim 3 and wherein said spring is in the form of at least one coil spring coiled about said shaft means and situated between the latter and at least one of said flanges.

5. The combination of claim 3 and wherein said spring is in the form of a torsion bar coaxially situated with respect to said shaft means.

6. The combination of claim 5 and wherein said yieldable means includes a force-transmitting element operatively connected with said torsion bar for transmitting a force with respect thereto, said force-transmitting element and torsion bar being axially movable one relative to the other for adjusting the effective length of said torsion bar while said force-transmitting element and torsion bar are prevented from turning angularly one relative to the other, and spring-adjusting means for adjusting the axial position of said element and torsion bar one relative to the other so as to adjust the effective length of said torsion bar.

7. The combination of claim 1 and wherein said connecting means which interconnects said flanges for rotation together while providing movement of one of said flanges axially with respect to the other includes at least one pin extending parallel to said shaft means, connected with one of said flanges, and the other of said flanges being formed with an axial bore receiving said pin, so that said pin constrains said flanges to rotate together while freeing said flanges for axial movement one relative to the other, and limiting means operatively connected with at least that one of said flanges which is movable toward and away from the other of said flanges for limiting the extent of movement of said one flange away from said other flange.

8. The combination of claim 7 and wherein said limiting means includes a collar fixed to said pin and a stop surface carried by one of said flanges and engaging said collar when said one flange is at the maximum distance from the other flange to limit further movement of said one flange away from said other flange.

9. The combination of claim 1 and wherein said yieldable means includes at least one coil spring coiled about said shaft means and situated between the latter and one of said flanges, said yieldable means providing transmission connections between said coil spring and said shaft means no the one hand and said latter flange on the other hand, said latter flange including a hub portion and an outer flange portion turnable with respect to said hub portion, and said spring being operatively connected to one of said flange portions, and adjustable connecting means adjustably connecting said flange portions to each other at a selected angular position one relative to the other for pretensioning said spring to a selected degree.

10. The combination of claim 1 and wherein said yieldable means includes a pair of coil springs surrounding said shaft means, operatively connected thereto, and respectively connected operatively with said flanges.

11. The combination of claim 10 and wherein said coil springs are respectively wound in opposite directions about said shaft means.

12. The combination of claim 1 and wherein said threaded connection includes a thread of a pitch large enough to provide for turning of said shaft means and said one flange one relative to the other at said threaded connection in response to an axial force which tends to axially displace said one flange and shaft means one relative to the other, and said axial force being provided by said yieldable means.

13. The combination of claim 1 and wherein the other of said flanges also has a threaded connection to said shaft means and said threaded connections both being identical except that one is a left hand threaded connection and the other is a right hand threaded connection, so that during adjustment of said flanges toward and away from each other the gap defined therebetween will remain at the same axial location with respect to said shaft means.

14. The combination of claim 1 and wherein said yieldable means includes a force-transmitting element which acts circumferentially with respect to said shaft means and flanges.

15. In a pulley transmission as recited in claim 1, said yieldable means acting circumferentially with respect to said shaft means and said adjusting means including a threaded connection between said one flange which is movable toward and away from the other flange and said shaft means so that in response to a force changing the condition of said yieldable means said one flange and said shaft means turn one relative to one another at said threaded connection, said threaded connection having a pitch small enough to render said connection self-locking so as to maintain said one flange with respect to said shaft means at an angular position thereon in which said one flange is situated by the action of said yieldable means.

16. The combination of claim 1 and wherein said yieldable means stores a force which is delivered upon yielding of said yieldable means.

17. A winding installation comprising drive means, a driving pulley assembly driven by said drive means, a driven pulley assembly and belt means interconnecting said driving and driven pulley assemblies for transmitting the drive from said driving pulley assembly to said driven pulley assembly, a second driving pulley assembly coaxial with said driven pulley assembly and operatively connected thereto to be driven thereby, and a second driven pulley assembly and belt means operatively connected with said second driving and said second driven pulley assemblies for transmitting the drive from said second driving pulley assembly to said second driven pulley assembly, and winding means operatively connected with said second driven pulley assembly to be driven thereby, each of said pulley assemblies including a shaft means, a pair of pulley flanges coaxially surrounding and freely turnable with respect to said shaft means, connecting means interconnecting said pulley flanges for preventing relative rotation therebetween while providing for axial movement of at least one of said pulley flanges toward and away from the other of said pulley flanges, at least said one pulley flange also being axially movable with respect to said shaft means, said pulley flanges respectively having inner belt-engaging surfaces which define between themselves a circumferential gap which in the region of the outer peripheries of said pulley flanges is wider than in the region of the inner peripheries thereof, yieldable means connected between at least one of said pulley flanges and said shaft means for urging said pulley flanges to turn with respect to said shaft means in one direction and for resisting turning of said pulley flanges with respect to said shaft means in an opposite direction, said yieldable means yielding during a change in the force transmitted between said flanges and shaft means, and adjusting means operatively connected to that one of said flanges which is movable toward and away from the other of said flanges for adjusting the axial distance of said flanges in response to a change in the force transmitted between said flanges and said shaft means, each of said belt means including a belt engaging the inner faces of a pair of said flanges, whereby in response to automatic adjustment of the distance between the flanges of each pulley assembly the radial distance of each belt from a shaft means around which it extends will be automatically adjusted.

18. A winding installation as recited in claim 17 and wherein a stepdown transmission is connected between said second driven pulley assembly and said winding means so that the latter is driven from said second driven pulley assembly through said stepdown transmission.

19. A web-transporting installation comprising web-advancing means for continuously advancing a web of sheet material in a given direction, a plurality of web-feeding rolls around which said web passes during advancement thereof by said web-advancing means, a plurality of driven pulley assemblies operatively connected with said rolls for driving the latter, driving pulley means, and a pulley belt means common to said driving pulley means and all of said driven pulley assemblies for rotating the latter and thus rotating said rolls in response to rotation of said driving pulley means, said driving pulley means being operatively connected to said web-advancing means to be driven in synchronism therewith, and each of said driven pulley assemblies including shaft means, a pair of pulley flanges surrounding and freely turnable with respect to said shaft means, connecting means interconnecting said flanges for preventing them from turning one relative to the other while freeing at least one of said flanges for movement toward and away from the other of said flanges, said flanges respectively having inner belt-engaging surfaces engaged by said belt means and said surfaces defining between each pair of flanges a circumferential gap which in the region of the outer peripheries of said flanges is wider than in the region of the inner peripheries thereof, yieldable means connected between said flanges, on the one hand, and said shaft means, on the other hand, for urging said flanges, on the one hand, and said shaft means, on the other hand, to turn in one direction relative to each other while resisting turning thereof in an opposite direction one with respect to the other, said yieldable means yielding during a change in a force transmitting between said flanges, on the one hand, and said shaft means, on the other hand, and adjusting means operatively connected with at least that one of said flanges which is movable toward and away from the other of said flanges for axially adjusting said one flange with respect to said other flange to adjust the width of the gap between said flanges, said adjusting means responding automatically to a change in the force transmitted between said shaft means and flanges for adjusting the size of the gap between said flanges.

References Cited

UNITED STATES PATENTS

| 2,607,235 | 8/1952 | Ruegenberg | 74—230.17 |
| 2,896,460 | 7/1959 | Mitchell | 74—230.17 |
| 2,952,161 | 9/1960 | Williams | 74—230.17 |
| 3,082,636 | 3/1963 | Steinlein | 74—230.17 |

ALLEN N. KNOWLES, *Primary Examiner.*

U.S. Cl. X.R.

74—230.17